United States Patent
Fujita et al.

(10) Patent No.: US 7,370,744 B2
(45) Date of Patent: May 13, 2008

(54) FRICTION ENGAGEMENT DEVICE OF AUTOMATIC TRANSMISSION

(75) Inventors: Hirofumi Fujita, Toyota (JP); Hiromichi Kimura, Okazaki (JP); Kazuyuki Watanabe, Anjo (JP); Kazuaki Nakamura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 280 days.

(21) Appl. No.: 11/241,998

(22) Filed: Oct. 4, 2005

(65) Prior Publication Data

US 2006/0099101 A1 May 11, 2006

(30) Foreign Application Priority Data

Nov. 11, 2004 (JP) ............................. 2004-328106

(51) Int. Cl.
*F16D 25/0638* (2006.01)
(52) U.S. Cl. .................. 192/85 AA; 475/146
(58) Field of Classification Search ........... 192/85 AA; 475/146
See application file for complete search history.

(56) References Cited

U.S. PATENT DOCUMENTS 3,282,385 A * 11/1966 Snyder .................. 192/85 AA
5,700,221 A * 12/1997 Mizuta ....................... 475/146

FOREIGN PATENT DOCUMENTS

JP 11-141662 A 5/1999

* cited by examiner

*Primary Examiner*—Richard M Lorence
(74) *Attorney, Agent, or Firm*—Oblon, Spivak, McClelland, Maier & Neustadt, P.C.

(57) ABSTRACT

In a friction engagement device of an automatic transmission, a brake piston is actuated by an oil pressure and a friction disc is pressed by the brake piston. The friction engagement device of an automatic transmission includes an oil pressure chamber extending in an annular shape and a main oil pressure supply path and a secondary oil pressure supply path each extending separately to supply oil to the oil pressure chamber. Each of the main oil pressure supply path and secondary oil pressure supply path connects to the oil pressure chamber in a position different from each other in a circumferential direction of the oil pressure chamber. With a construction as such, a friction engagement device of an automatic transmission is provided which prevents a load to the friction disc from locally increasing and attains a smooth speed-changing operation.

5 Claims, 4 Drawing Sheets

FRICTION ENGAGEMENT DEVICE OF AUTOMATIC TRANSMISSION

This nonprovisional application is based on Japanese Patent Application No. 2004-328106 filed with the Japan Patent Office on Nov. 11, 2004, the entire contents of which are hereby incorporated by reference.

BACKGROUND OF THE INVENTION

1. Field of the Invention

The present invention relates to a friction engagement device of an automatic transmission. More specifically, the present invention relates to a friction engagement device used as a brake or a clutch of an automatic transmission.

2. Description of the Background Art

Japanese Patent Laying-Open No. 11-141662, for example, discloses a conventional friction engagement device of an automatic transmission which ensures a rigidity of a brake piston without causing interference with a car body floor. The automatic transmission disclosed in this publication includes friction discs on a fixed side and a rotation side which form a multiple disc brake, and a ring-like brake piston for pressing the friction discs. An oil pressure chamber is formed in a position adjacent to the brake piston, and an oil hole connecting to an oil pressure control valve unit is formed in a bottom portion of the oil pressure chamber.

In the automatic transmission disclosed in Japanese Patent Laying-Open No. 11-141662, an oil pressure is supplied from the oil pressure control valve unit to the oil pressure chamber through the oil hole. With this, the brake piston strokes and allows friction discs of the fixed side and the rotation side to engage with each other. Since the oil hole is provided only in the bottom portion of the oil pressure chamber, however, the brake piston may press the friction discs in an inclined state. In this situation, a load to the friction discs becomes uneven, which degrades durability of the friction discs. In addition, a force applied to the friction disc varies in a circumference of the friction disc, which disturbs a smooth speed-changing operation. Such phenomenon occurs more frequently at a lower temperature with an increased viscosity of oil, and therefore reliability of the automatic transmission decreases particularly when it is used in cold climates.

SUMMARY OF THE INVENTION

The present invention is made to solve the above-described problem. An object of the present invention is to provide a friction engagement device of an automatic transmission which prevents a load to a friction disc from locally increasing and attains a smooth speed-changing operation.

A friction engagement device of an automatic transmission according to the present invention actuates a piston by an oil pressure to press a friction disc with the piston. The friction engagement device of an automatic transmission includes an oil pressure chamber formed to extend in an annular shape, and a plurality of oil paths each extending separately to supply oil to the oil pressure chamber. Each of the plurality of oil paths connects to the oil pressure chamber in a position different from each other in a circumferential direction of the oil pressure chamber.

According to the friction engagement device of an automatic transmission constructed as such, oil is supplied through the plurality of oil paths to a plurality of different positions of the oil pressure chamber in the circumferential direction thereof. With this, an oil pressure can be generated in the same timing in different positions in the oil pressure chamber, and the piston can be actuated without inclination. As a result, a load to the friction disc pressed by the piston becomes uniform and durability of the friction disc can be increased. In addition, a smooth speed-changing operation is attained and controllability of the automatic transmission can be increased.

The plurality of oil paths include a first oil path having a relatively short length and a second oil path having a relatively long length. The friction engagement device of an automatic transmission further includes a shutoff member provided in the second oil path so as to freely open and close to control a flow of oil in the second oil path. According to the friction engagement device of an automatic transmission constructed as such, the piston can be actuated without inclination by opening the shutoff member and supplying oil to the oil pressure chamber from the first and second oil paths. In addition, the oil pressure can be supplied in a shorter time by closing the shutoff member and supplying oil to the oil pressure chamber from the first oil path having a relatively short length. With this, responsiveness of the automatic transmission can be increased.

The shutoff member is preferably closed to shut off a flow of oil in the second oil path when a determination is made that an oil temperature is higher than a predetermined temperature, and is opened to allow oil to flow in the second oil path when a determination is made that the oil temperature is lower than the predetermined temperature. In addition, the shutoff member is preferably closed to shut off a flow of oil in the second oil path when a determination is made that a viscosity of oil is lower than a predetermined value, and is opened to allow oil to flow in the second oil path when a determination is made that the viscosity of oil is higher than the predetermined value.

According to the friction engagement device of an automatic transmission constructed as such, when the oil temperature is high, that is, when the oil has a low viscosity, oil spreads through the oil pressure chamber relatively fast and therefore the piston is not likely to incline when actuated. Therefore, in this situation, the shutoff member is closed and oil is supplied to the oil pressure chamber from the first oil path to increase responsiveness of the automatic transmission. On the other hand, when the oil temperature is low, that is, when the oil has a high viscosity, oil spreads through the oil pressure chamber relatively slowly and therefore the piston tends to incline when actuated. Therefore, in this situation, the shutoff member is opened and oil is supplied to the oil pressure chamber from the first and second oil paths to prevent the piston from being actuated in an inclined state. With this, an automatic transmission having increased responsiveness and preventing inclination of a piston can be implemented.

The shutoff member preferably includes a shape-memory spring having a spring modulus varying according to the oil temperature, and a check ball powered by the shape-memory spring to open and close the second oil path. According to the friction engagement device of an automatic transmission constructed as such, a force applied to the check ball by the shape-memory spring varies according to the oil temperature, and the check ball is positioned in an opening/closing position corresponding to the oil temperature. With this, a flow of oil in the second oil path can be controlled with a simple and inexpensive construction.

The shutoff member is preferably an electromagnetic valve. According to the friction engagement device of an automatic transmission constructed as such, controllability of the flow of oil in the second oil path can be increased.

The plurality of oil paths include a first oil path having a relatively short length and a second oil path having a relatively long length. Preferably, the first oil path is formed to let oil flow therethrough with a relatively large resistance, and the second oil path is formed to let oil flow therethrough with a relatively small resistance. According to the friction engagement device of an automatic transmission constructed as such, an oil pressure can be prevented from being generated in different timings in positions in which the first and second oil paths respectively connect to the oil pressure chamber because of a difference in lengths of the oil paths. With this, inclination of the piston during actuation can be suppressed more effectively.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
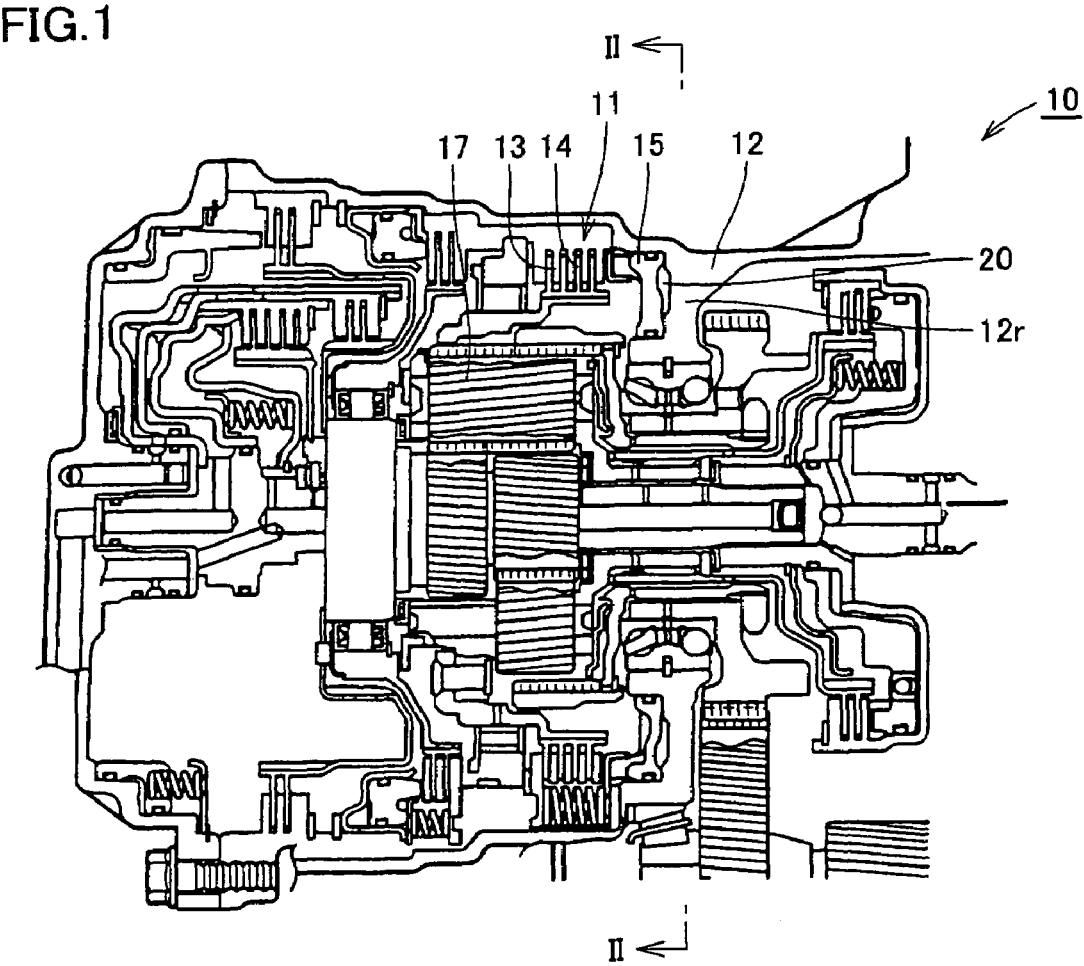
FIG. 1 is a cross sectional view of an automatic transmission to which a friction engagement device in an embodiment of the present invention is applied.

Embodiments of the present invention will now be described referring to the drawings. In the drawings described below, the same or corresponding members are indicated with the same reference characters.

Referring to FIG. 1, an automatic transmission 10 includes a planetary gear 17 which decreases or increases a speed of input rotation or reverses a direction of the rotation and outputs the result. Automatic transmission 10 is provided with a brake 11 for locking rotation of a planetary carrier forming planetary gear 17.

Brake 11 includes a friction disc 13 fixed on a case 12 housing planetary gear 17, a friction disc 14 fixed on a side of the planetary carrier, and a brake piston 15 arranged in line with friction discs 13 and 14 in a direction of an axis of planetary gear 17. Each of friction discs 13 and 14 has a ring shape extending along an inner periphery of case 12, and is formed in a comb-like shape having teeth alternately meshing with each other in a direction along the axis of planetary gear 17. As with friction discs 13 and 14, brake piston 15 has a ring shape.

An oil pressure chamber 20 extending in an annular shape is formed in case 12 in a position adjacent to brake piston 15. Oil pressure chamber 20 is formed in a space surrounded with a rib-like portion 12r, which projects inwardly in a radial direction from the inner periphery of case 12, and brake piston 15. With a supply of an oil pressure to oil pressure chamber 20, brake piston 15 strokes in a direction of the axis of planetary gear 17 and presses friction discs 13 and 14. The pressed friction discs 13 and 14 contact each other under pressure and, as a result, rotation of the planetary carrier is locked.

Figure 2:
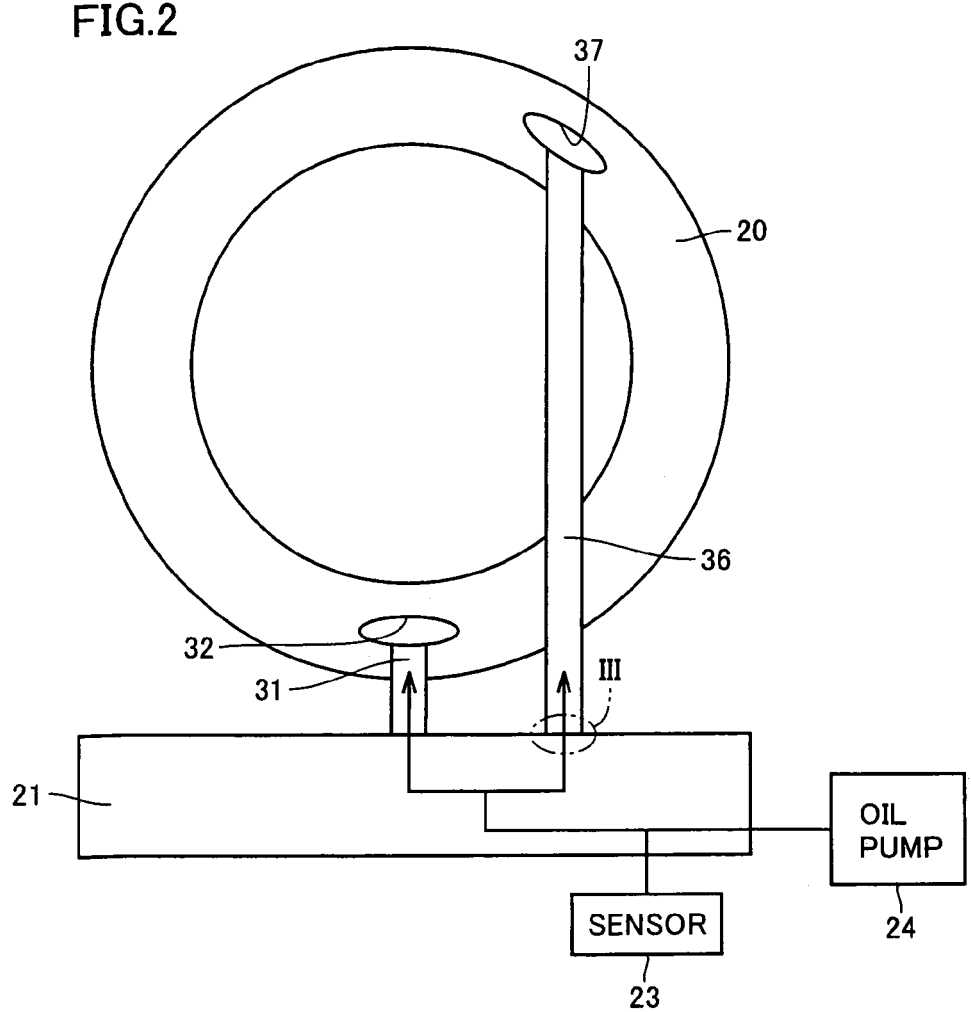
FIG. 2 is a schematic view of the automatic transmission with respect to the line II-II shown in FIG. 1 viewed in the direction of arrows.

Referring to FIG. 2, automatic transmission 10 is provided with an oil pump 24 for generating the oil pressure and a valve body 21 having a solenoid valve attached thereon for controlling the oil pressure. Valve body 21 is provided on a side of automatic transmission 10 on which an oil pan is provided, that is, on a bottom side of oil pressure chamber 20. An oil temperature sensor 23 is provided on valve body 21, and a temperature of oil flowing through valve body 21 is detected with oil temperature sensor 23.

A main oil pressure supply path 31 and a secondary oil pressure supply path 36 extending from valve body 21 to oil pressure chamber 20 are further formed in automatic transmission 10. Main oil pressure supply path 31 and secondary oil pressure supply path 36 extend independently from a branched position in valve body 21 to oil pressure chamber 20. Main oil pressure supply path 31 connects to a position near a bottom portion of oil pressure chamber 20 through an opening 32 formed in case 12. Secondary oil pressure supply path 36 connects to a position near a top portion of oil pressure chamber 20 through an opening 37 formed in case 12. That is, main oil pressure supply path 31 and secondary oil pressure supply path 36 respectively connect to oil pressure chamber 20 in positions different from each other in a circumferential direction of oil pressure chamber 20. Main oil pressure supply path 31 is formed with a conduit having a relatively short length, and secondary oil pressure supply path 36 is formed with a conduit having a relatively long length.

With a construction as such, oil is supplied to oil pressure chamber 20 via two paths, that is, main oil pressure supply path 31 and secondary oil pressure supply path 36 in this embodiment. Therefore, the oil pressure can be supplied to oil pressure chamber 20 from a plurality of different positions in the circumferential direction of oil pressure chamber 20, and timings of supplying the oil pressure (application timings of the oil pressure) can be equalized on a whole surface of brake piston 15 receiving the oil pressure. As a result, brake piston 15 can stroke without inclination.

In addition, main oil pressure supply path 31 is preferably formed to have a conduit resistance larger than that of secondary oil pressure supply path 36. With this, oil flows more easily in secondary oil pressure supply path 36 having a relatively small conduit resistance than in main oil pressure supply path 31 having a relatively large conduit resistance. As a result, main oil pressure supply path 31 and secondary oil pressure supply path 36 can be prevented from having different application timings of the oil pressure due to a difference in lengths of conduits. With this, inclination of brake piston 15 during stroking can be suppressed more effectively.

For controlling the conduit resistances of main oil pressure supply path 31 and secondary oil pressure supply path 36 as described above, for example, a diameter of the conduit of main oil pressure supply path 31 can be made smaller than that of secondary oil pressure supply path 36. In addition, a diameter of opening 32 can be set to be smaller than that of opening 37, or surface roughness of an inner wall of main oil pressure supply path 31 can be set to be larger than that of secondary oil pressure supply path 36. Alternatively, a rotatable blade as a resistance to an oil flow may be provided in main oil pressure supply path 31.

Though FIG. 2 shows main oil pressure supply path 31 and secondary oil pressure supply path 36 branched inside valve body 21, main oil pressure supply path 31 and secondary oil pressure supply path 36 may be branched outside valve body 21 such as in case 12. In this situation, oil paths extending from the branched position to oil pressure chamber 20 respectively become main oil pressure supply path 31 and secondary oil pressure supply path 36. In addition, main oil pressure supply path 31 and secondary oil pressure supply path 36 may be formed to have the same length, or another oil pressure supply path may be formed in addition to main oil pressure supply path 31 and secondary oil pressure supply path 36.

Figure 3:
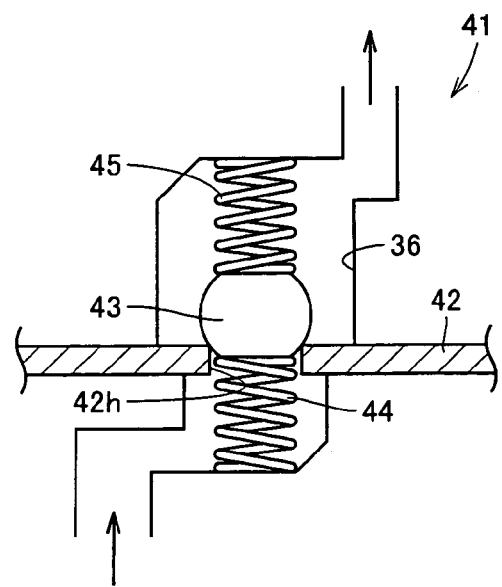
FIG. 3 is an enlarged cross sectional view of a portion enclosed with the long dashed double-short dashed line III shown in FIG. 2.

Referring to FIG. 3, an oil pressure switching mechanism 41 placed in secondary oil pressure supply path 36 is provided in valve body 21. Oil pressure switching mechanism 41 is formed with a check ball 43 and springs 44 and 45 arranged to power check ball 43 from both sides. Check ball 43 is arranged so as to block a hole 42h formed in a partition wall 42. Oil flowing through secondary oil pressure supply path 36 fills a space around springs 44 and 45.

Figure 4:
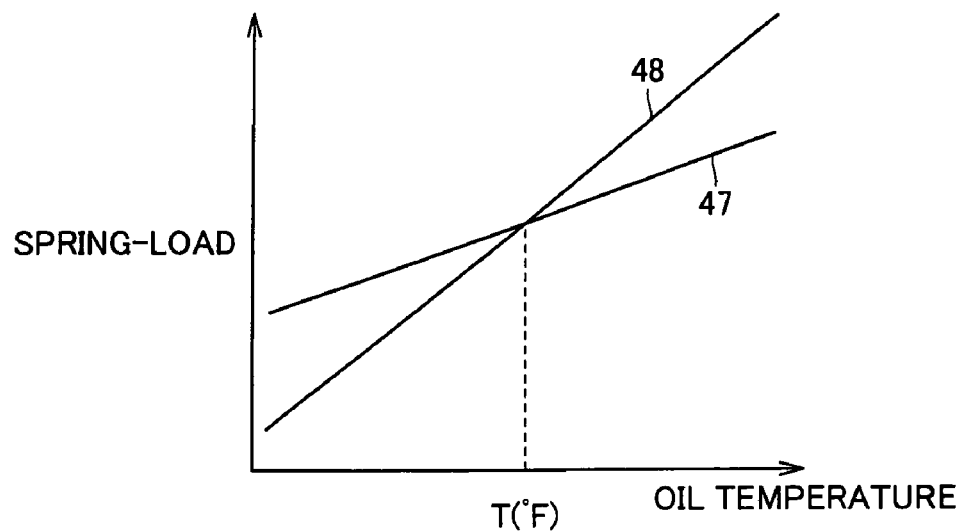
FIG. 4 is a graph indicating properties of springs shown in FIG. 3.

Referring to FIG. 4, properties of springs 44 and 45 are respectively shown with straight lines 47 and 48. Referring to FIGS. 3 and 4, properties of springs 44 and 45 vary according to a temperature of oil flowing through secondary oil pressure supply path 36. A spring modulus of each spring increases as the temperature of oil increases, and therefore a spring-load for powering check ball 43 increases. A ratio of a variation in the spring-load to a variation in an oil temperature (a slope of each of straight lines 47 and 48) is larger in spring 45 than in spring 44.

When the oil temperature is lower than T (° F.), the spring-load of spring 44 becomes larger than that of spring 45. In this situation, check ball 43 is pushed by spring 44 to a position away from hole 42h, and allows oil to pass through secondary oil pressure supply path 36. In contrast, when the oil temperature is higher than T (° F.), the spring-load of spring 45 becomes larger than that of spring 44. In this situation, check ball 43 is pushed by spring 45 to a position to block hole 42h, and shuts off a flow of oil in secondary oil pressure supply path 36.

With a construction as such, oil is supplied to oil pressure chamber 20 from both of main oil pressure supply path 31 and secondary oil pressure supply path 36 when the oil temperature is lower than T (° F.). When the oil temperature is low, the oil has a high viscosity. Therefore, the oil does not flow easily and application timings of the oil pressure in oil pressure chamber 20 tend to differ from each other. In this situation, the oil pressure is supplied to oil pressure chamber 20 from a plurality of positions to reliably prevent brake piston 15 from stroking in an inclined state. On the other hand, oil is supplied to oil pressure chamber 20 only from main oil pressure supply path 31 when the oil temperature is higher than T (° F.). When the oil temperature is high, the oil has a low viscosity and application timings of the oil pressure are not likely to differ from each other. Therefore, in this situation, only main oil pressure supply path 31 having a relatively short length is used to increase responsiveness of automatic transmission 10.

It is to be noted that, oil pressure switching mechanism 41 formed with check ball 43 and springs 44 and 45 may be arranged outside valve body 21 such as in secondary oil pressure supply path 36 formed in case 12.

Figure 5:
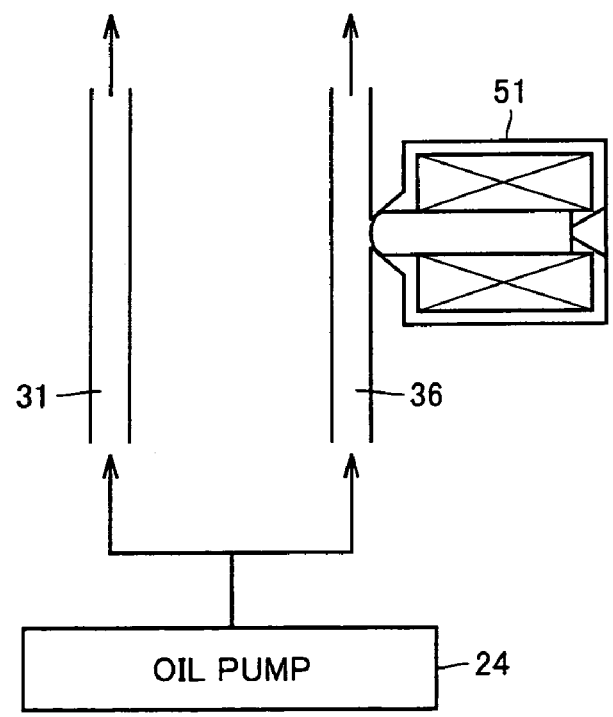
FIG. 5 is a schematic view of a modified example of an oil pressure switching mechanism shown in FIG. 3.

Referring to FIG. 5, in a modified example, an electromagnetic valve 51 is provided on secondary oil pressure supply path 36 in place of oil pressure switching mechanism 41 shown in FIG. 3. Electromagnetic valve 51 is formed, for example, integrally with the solenoid valve provided on valve body 21. Electromagnetic valve 51 receives a signal from oil temperature sensor 23 and is controlled based on the oil temperature detected with oil temperature sensor 23. That is, when the oil temperature detected is lower than T (° F.), electromagnetic valve 51 is controlled to open and allow oil to flow through secondary oil pressure supply path 36. On the other hand, when the oil temperature detected is higher than T (° F.), electromagnetic valve 51 is controlled to close and shut off a flow of oil in secondary oil pressure supply path 36.

It is to be noted that, a viscosity detection sensor may be provided besides oil temperature sensor 23, and opening and closing of electromagnetic valve 51 may be controlled based on a viscosity of oil detected with the sensor. Assuming that the viscosity of oil is Y (Pa·s) at the oil temperature of T (° F.), electromagnetic valve 51 is controlled to open when the viscosity detected is higher than Y (Pa·s), and is controlled to close when the viscosity detected is lower than Y (Pa·s).

To examine a relation between positions of main oil pressure supply path 31 and secondary oil pressure supply path 36 connecting to oil pressure chamber 20 and an inclination amount of brake piston 15, the following test was performed.

Figure 6:
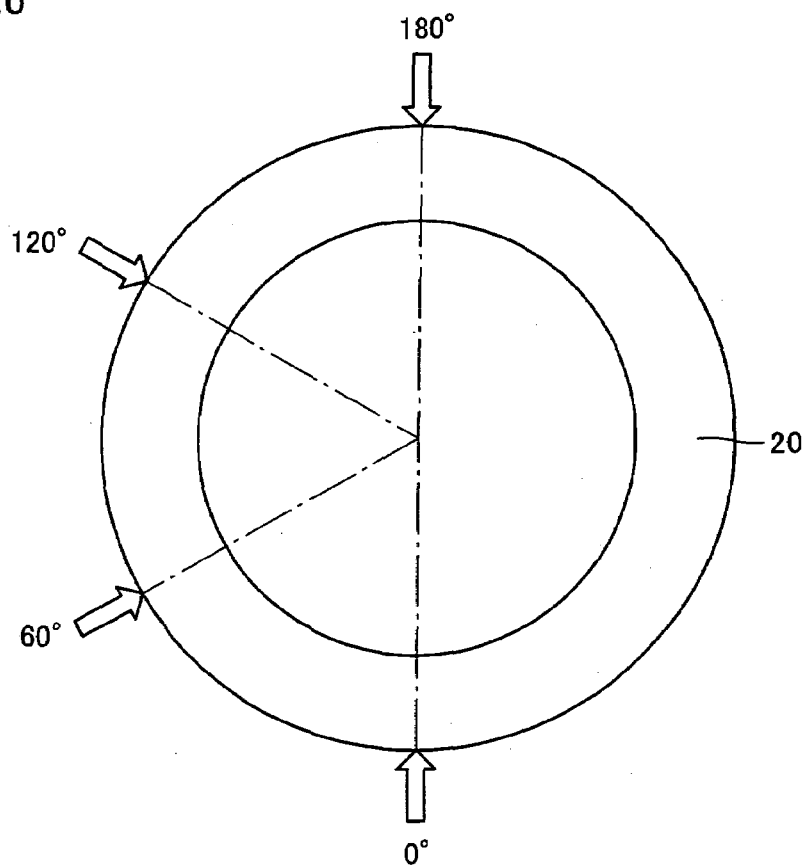
FIG. 6 is a schematic view of positions in which a main oil pressure supply path and a secondary oil pressure supply path respectively connect to an oil pressure chamber.

Referring to FIG. 6, a position of main oil pressure supply path 31 connecting to oil pressure chamber 20 was fixed to a position of 0° indicated in the drawing. For comparison, an oil pressure was first supplied from main oil pressure supply path 31 to oil pressure chamber 20. Strokes of brake piston 15 were then measured at a plurality of positions to obtain an inclination amount of brake piston 15 during supply of the oil pressure based on a result of measurement. A viscosity of oil was set to that at −22 (° F.). Thereafter, secondary oil pressure supply path 36 was provided in respective positions of 60°, 120° and 180° indicated in the drawing for connecting to oil pressure chamber 20, and the oil pressure was supplied to oil pressure chamber 20 from both of main oil pressure supply path 31 and secondary oil pressure supply path 36 connecting in each position. In each situation, the inclination amount of brake piston 15 was similarly obtained. A result of the test is summarized in FIG. 7.

Figure 7:
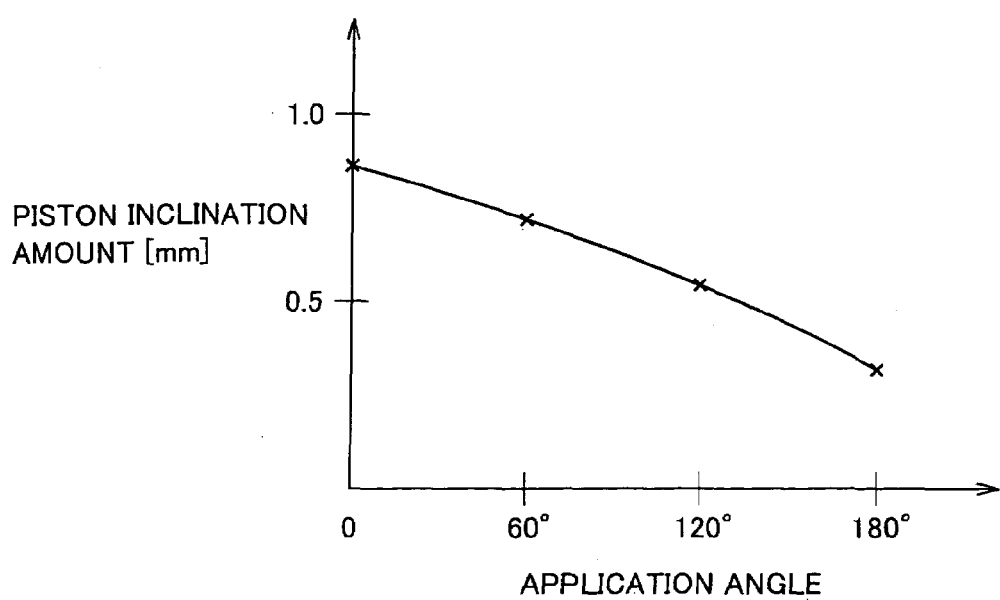
FIG. 7 is a graph indicating a relationship between an application angle and an inclination amount of a brake piston.

FIG. 7 indicates a relationship between an application angle, which is a phase difference between main oil pressure supply path 31 and secondary oil pressure supply path 36, and the inclination amount of the brake piston. As is seen from FIG. 7, the inclination amount of brake piston 15 could be made smaller by supplying the oil pressure from both of main oil pressure supply path 31 and secondary oil pressure supply path 36 as compared to a situation in which the oil pressure was supplied only from main oil pressure supply path 31. In addition, the larger the application angle between main oil pressure supply path 31 and secondary oil pressure supply path 36 was, the smaller the inclination amount of brake piston 15 became, and the smallest inclination amount of brake piston 15 was obtained when the application angle was 180°.

A friction engagement device of an automatic transmission in the embodiment of the present invention is a friction engagement device of automatic transmission 10 in which brake piston 15 as a piston is actuated by an oil pressure and friction discs 13 and 14 are pressed by brake piston 15. The friction engagement device of automatic transmission 10 includes oil pressure chamber 20 extending in an annular shape and main oil pressure supply path 31 and secondary oil pressure supply path 36 as a plurality of oil paths each extending separately to supply oil to oil pressure chamber 20. Each of main oil pressure supply path 31 and secondary oil pressure supply path 36 connects to oil pressure chamber 20 in a position different from each other in a circumferential direction of oil pressure chamber 20. The friction engagement device of the automatic transmission is used in brake 11 as a brake device of automatic transmission 10.

The phase difference between positions of main oil pressure supply path 31 and secondary oil pressure supply path 36 respectively connecting to oil pressure chamber 20 is preferably at least 60° and at most 180°. More preferably, the phase difference between positions of main oil pressure supply path 31 and secondary oil pressure supply path 36 respectively connecting to oil pressure chamber 20 is at least 90° and at most 180°. Further preferably, the phase difference between positions of main oil pressure supply path 31 and secondary oil pressure supply path 36 respectively connecting to oil pressure chamber 20 is at least 120° and at most 180°.

According to the friction engagement device of the automatic transmission in the embodiment of the present invention constructed as such, brake piston 15 can stroke without inclination and a load applied to each of friction discs 13 and 14 can be evenly distributed in a circumferential direction of the friction disc. With this, a thermal load to each of friction discs 13 and 14 can be prevented from locally increasing, and defectiveness such as burning of friction discs 13 and 14 can be eliminated. In addition, since friction discs 13 and 14 evenly contact each other under pressure, brake 11 can be accurately actuated corresponding to an oil pressure control. As a result, a smooth speed-changing operation can be attained and, for example, generation of a shock can be reliably avoided during the speed-changing operation with a clutch-to-clutch control.

It is to be noted that, though the present invention is applied to brake 11 in this embodiment, the present invention may be applied to a clutch of an automatic transmission. The present invention may also be applied to a continuously variable transmission.

As described above, according to the present invention, a friction engagement device of an automatic transmission can be provided which prevents a load to a friction disc from locally increasing and attains a smooth speed-changing operation.

Although the present invention has been described and illustrated in detail, it is clearly understood that the same is by way of illustration and example only and is not to be taken by way of limitation, the scope of the present invention being limited only by the terms of the appended claims.

What is claimed is:

1. A friction engagement device of an automatic transmission having a piston actuated by an oil pressure to press a friction disc with the piston, comprising:
   an oil pressure chamber formed to extend in an annular shape; and
   a plurality of oil paths each extending separately to supply oil to said oil pressure chamber;
   wherein each of said plurality of oil paths connects to said oil pressure chamber in a position different from each other in a circumferential direction of said oil pressure chamber,
   wherein said plurality of oil paths include a first oil path having a relatively short length and a second oil path having a relatively long length, said first oil path is formed to let oil flow therethrough with a relatively large resistance, and said second oil path is formed to let oil flow therethrough with a relatively small resistance,
   wherein said relatively large resistance and said relatively small resistance are selected such that different application timings of the oil pressure to said oil pressure chamber do not occur due to the differences in length of said relatively long length of the second oil path and said relatively short length of the first oil path.

2. A friction engagement device of an automatic transmission having a piston actuated by an oil pressure to press a friction disc with the piston, comprising:
   an oil pressure chamber formed to extend in an annular shape; and
   a plurality of oil paths each extending separately to supply oil to said oil pressure chamber;
   wherein each of said plurality of oil paths connects to said oil pressure chamber in a position different from each other in a circumferential direction of said oil pressure chamber,
   wherein said plurality of oil paths include a first oil path having a relatively short length and a second oil path having a relatively long length, and said friction engagement device of an automatic transmission further comprising a shutoff member provided in said second oil path so as to freely open and close to control a flow of oil in said second oil path,
   wherein said shutoff member is closed to shut off a flow of oil in said second oil path when a determination is made that an oil temperature is higher than a predetermined temperature, and is opened to allow oil to flow in said second oil path when a determination is made that the oil temperature is lower than said predetermined temperature.

3. A friction engagement device of an automatic transmission having a piston actuated by an oil pressure to press a friction disc with the piston, comprising:
   an oil pressure chamber formed to extend in an annular shape; and
   a plurality of oil paths each extending separately to supply oil to said oil pressure chamber;
   wherein each of said plurality of oil paths connects to said oil pressure chamber in a position different from each other in a circumferential direction of said oil pressure chamber,
   wherein said plurality of oil paths include a first oil path having a relatively short length and a second oil path having a relatively long length, and said friction engagement device of an automatic transmission further comprising a shutoff member provided in said second oil path so as to freely open and close to control a flow of oil in said second oil path,
   wherein said shutoff member is closed to shut off a flow of oil in said second oil path when a determination is made that a viscosity of oil is lower than a predetermined value, and is opened to allow oil to flow in said second oil path when a determination is made that the viscosity of oil is higher than said predetermined value.

4. A friction engagement device of an automatic transmission having a piston actuated by an oil pressure to press a friction disc with the piston, comprising:
   an oil pressure chamber formed to extend in an annular shape; and a plurality of oil paths each extending separately to supply oil to said oil pressure chamber;

wherein each of said plurality of oil paths connects to said oil pressure chamber in a position different from each other in a circumferential direction of said oil pressure chamber, wherein said plurality of oil paths include a first oil path having a relatively short length and a second oil path having a relatively long length, and said friction engagement device of an automatic transmission further comprising a shutoff member provided in said second oil path so as to freely open and close to control a flow of oil in said second oil path, wherein said shutoff member includes a shape-memory spring having a spring modulus varying according to an oil temperature, and a check ball powered by said shape-memory spring to open and close said second oil path.

5. A friction engagement device of an automatic transmission having a piston actuated by an oil pressure to press a friction disc with the piston, comprising:

an oil pressure chamber formed to extend in an annular shape; and a plurality of oil paths each extending separately to supply oil to said oil pressure chamber;

wherein each of said plurality of oil paths connects to said oil pressure chamber in a position different from each other in a circumferential direction of said oil pressure chamber, wherein said plurality of oil paths include a first oil path having a relatively short length and a second oil path having a relatively long length, and said friction engagement device of an automatic transmission further comprising a shutoff member provided in said second oil path so as to freely open and close to control a flow of oil in said second oil path, wherein said shutoff member is an electromagnetic valve.

* * * * *